(12) United States Patent
Salamone

(10) Patent No.: US 11,981,124 B2
(45) Date of Patent: May 14, 2024

(54) METHOD AND SYSTEM FOR ALIGNING IMAGES PRINTED WITH DIGITAL PRINTER AND ANALOG CYLINDERS

(71) Applicant: Electronics for Imaging, Inc., Fremont, CA (US)

(72) Inventor: Filippo Salamone, Grassobbio (IT)

(73) Assignee: Electronics for Imaging, Inc., Londonderry, NH (US)

( * ) Notice: Subject to any disclaimer, the term of this patent is extended or adjusted under 35 U.S.C. 154(b) by 39 days.

(21) Appl. No.: 17/933,031

(22) Filed: Sep. 16, 2022

(65) Prior Publication Data

US 2024/0092098 A1    Mar. 21, 2024

(51) Int. Cl.
*B41J 11/42* (2006.01)
*G06K 15/02* (2006.01)
*G06K 15/10* (2006.01)

(52) U.S. Cl.
CPC .......... *B41J 11/42* (2013.01); *G06K 15/027* (2013.01); *G06K 15/102* (2013.01); *G06K 15/1849* (2013.01)

(58) Field of Classification Search
CPC ..... B41J 11/42; G06K 15/027; G06K 15/102; G06K 15/1849
USPC .................................. 347/16; 358/1.9, 1.15
See application file for complete search history.

(56) References Cited

U.S. PATENT DOCUMENTS

| 10,960,660 | B2 * | 3/2021 | Landa ............... B41J 2/0057 |
| 2009/0231374 | A1 | 9/2009 | Van et al. |
| 2011/0188060 | A1 * | 8/2011 | Voss ............... B41J 13/0027 358/1.9 |
| 2014/0313256 | A1 | 10/2014 | Donaldson et al. |
| 2015/0042736 | A1 | 2/2015 | Landa et al. |
| 2018/0361769 | A1 | 12/2018 | Edwards |
| 2019/0366743 | A1 | 12/2019 | Terradellas Callau et al. |
| 2022/0024224 | A1 | 1/2022 | Cavallini et al. |

FOREIGN PATENT DOCUMENTS

WO    2018019143 A1    2/2018

* cited by examiner

*Primary Examiner* — Quang N Vo
(74) *Attorney, Agent, or Firm* — Perkins Coie LLP

(57) ABSTRACT

Techniques for aligning images printed with digital printer and rotary cylinders include measuring a position of a substrate on a belt, capturing by a camera a digital image of the substrate, transmitting by camera the digital image to a processing device, performing digital image processing on the digital image to identify two shapes, determining the positions of each of the two shapes using the measured position of the substrate, measuring a distance between the determined positions of each of the two shapes, calculating an error, where the error is the difference between the measured distance and a predetermined distance of the two shapes, and adjusting either a digital printer, a speed of a rotary cylinder, or a speed of the belt, based on the error.

20 Claims, 5 Drawing Sheets

METHOD AND SYSTEM FOR ALIGNING IMAGES PRINTED WITH DIGITAL PRINTER AND ANALOG CYLINDERS

BACKGROUND OF THE INVENTION

Technical Field

This invention relates generally to the field of digital printers and analog cylinders. More specifically, this invention relates to a method and system for aligning images printed with digital printer and analog cylinders.

Description of the Related Art

A printer is a device capable of transferring an image to a substrate using different technologies. Digital printing is a technology where the printing device is an array of piezo or thermal nozzles, each capable of ejecting an ink drop. The drops deposited over the substrate create the image. Having more than one array of printheads makes it possible to create a multi-color image.

In traditional rotary printing, e.g. in serigraphy, as compared to digital printing, one color is imaged through a cylinder with holes in correspondence of the points where ink is to be deposited on the substrate. The ink flowing inside the cylinder is squeezed through those holes and deposited on the substrate. Having more than one cylinder makes it possible to create a multi-color image.

Both digital and analog systems are registered, i.e. they print substantially exactly as intended, to have a good quality result.

The alignment of the digital printer is normally achieved and kept through signals coming from an encoder measuring the substrate movement. On the rotary machine, the substrate movement is measured through the encoder but the tolerances of construction of the cylinder are big and therefore the cylinder trend is to misalign from other cylinders or digital printer.

An image photographing alignment method and system is taught in WO2018019143A1, Image Photographing Alignment Method And System (published Jan. 2, 2018) to S. Sheng and G. Ji. Specifically, the method comprises: providing an imaging device having a photographing device for acquiring an image and a carrier platform directly facing the photographing device, the carrier platform being capable of moving from a reset point along the X-axis direction and/or along the Y-axis direction; placing a sample on the carrier platform, the carrier platform being moved to enable the photographing device to scan the sample in a step-by-step manner, so as to determine a rectangular photographing region within a sample region; dividing the rectangular photographing region into multiple sub-regions arranged as matrices; and moving the carrier platform and photographing a preset sub-region twice and, according to the result of said photographing, correcting a movement error of the carrier platform during alignment of the photographing device with respect to each sub-region. Such image photographing alignment method and system can eliminate movement error of the carrier platform during image photographing.

SUMMARY

Techniques for aligning images printed with digital printer and rotary cylinders include measuring a position of a substrate on a belt, capturing by a camera a digital image of the substrate, transmitting by camera the digital image to a processing device, performing digital image processing on the digital image to identify two shapes, determining the positions of each of the two shapes using the measured position of the substrate, measuring a distance between the determined positions of each of the two shapes, calculating an error, where the error is the difference between the measured distance and a predetermined distance of the two shapes, and adjusting either a digital printer, a speed of a rotary cylinder, or a speed of the belt, based on the error.

DETAILED DESCRIPTION

Overview

In an embodiment, one or more cameras are positioned on the edges of the substrate facing toward the substrate edge. The cameras have a frame rate and resolution sufficient to manage the speed of the machine. For the digital part of the machine, a marker is a digital pattern that is printed on the substrate and can be recognized by the software algorithm. For the analog part of the machine, another marker is an analog pattern that is printed on the substrate and also can be recognized by the software algorithm. The difference of position between the two markers, e.g. whether the two markers are fitting or aligning over each other, is computed at every turn of the cylinder, i.e. every image. The difference, also referred to herein as error, is measured and stored into the computer memory for post-processing.

By collecting an array of such measures, the system is configured to calculate the following parameter values at every turn of the cylinder:
  error on belt direction (also called X axis);
  error on belt cross direction (also called Y axis);
  difference between the size of the digital image and the analog cylinder; and
  when having two cameras, the difference between the images printed on left and right edges.

In an embodiment, the errors parameters are sent then to the digital printing software and to the analog cylinders motor drivers to compensate for the misalignments. In the case of images with different sizes on left and right edges, the system is configured so that the image can be recalculated by a software or hardware capable of shrinking or enlarging the image.

Figure 1:
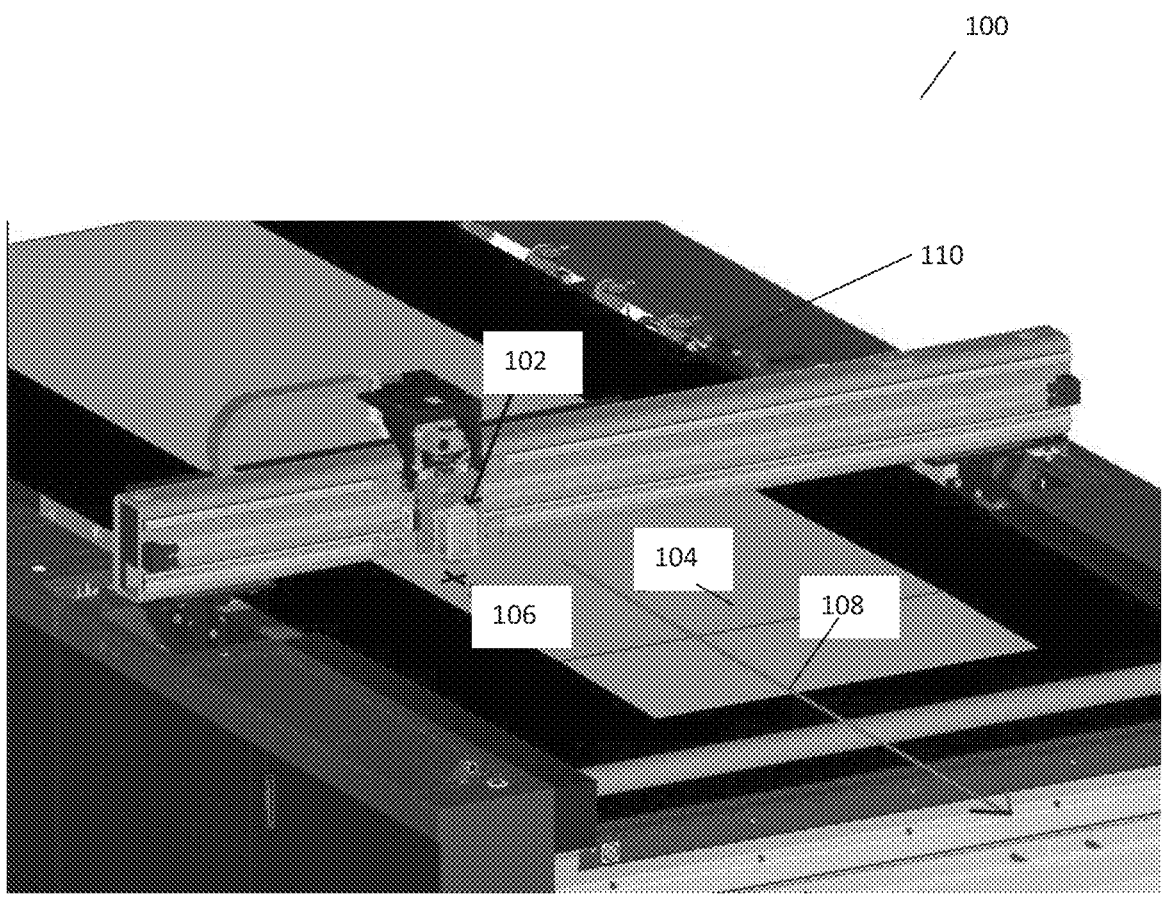
FIG. 1 is a schematic diagram of the measurement system 100, in accordance with an embodiment.

FIG. 1 is a schematic diagram of the hybrid system 100, in accordance with an embodiment. A camera 102 is placed in a position to scan and measure an image of an image marker 106, as the image marker 106 placed on a substrate 104 moves along the printer belt 110, where the substrate movement 108 is depicted by the arrow. Image marker 106 is shown as a cross in the figure. In an embodiment, there are at least two image markers 106, one for the digital aspect of the system and the other for the mechanical aspect of the system. Marks can be placed with any of a pre-defined shape, size, orientation, and dimension. In an example, the innovative printer measures whether the first cross of the digital image fits over or is aligned over the second cross of the mechanical image (or vice-versa).

In accordance with embodiments herein, the innovative process can be applied to digital single pass machines and analog rotaries, and also mixed technologies, e.g. digital and rotary, digital.

It has been found that alignment of the images during the printing process is not easy, especially at high speed. Thus, the innovative system and method is able to keep aligned the colors of the press in unmanned way.

The innovative system and method are a general system and method of measurement for the substrate, whether the substrate is fabric, paper, film, continuous, or discrete.

In an embodiment, the camera 102 captures the placement of each marker, one for the digital aspect of the system and the other for the mechanical aspect, and measures the distance between the digital and analog placements by measuring the distance between the two markers. It should be appreciated that the camera has loaded thereon or is communicably connected to, via a network, an algorithm that measures the distance between two captured distances. Then, as configured, the innovative system makes the appropriate compensation for certain discrepancies found in the computed distances.

In an embodiment, the markers are imprinted on the substrate, such as the fabric, as are the other part of the image. For example, when the designer programs the design, the designer instructs the program to place the markers in the design, on the edge of the fabric for measuring.

An Exemplary Embodiment

Figure 2:
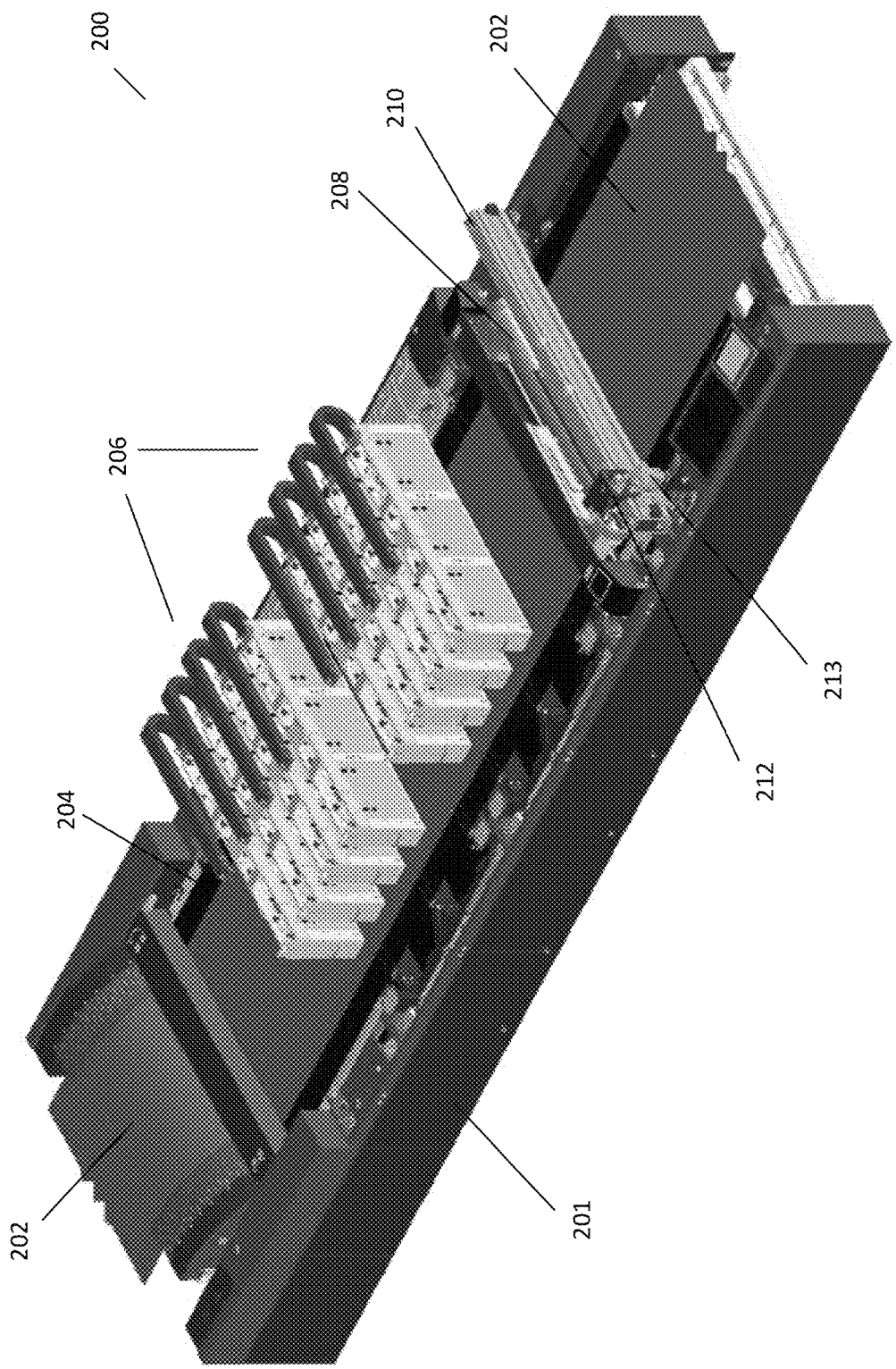
FIG. 2 is a schematic diagram of the hybrid printing system for aligning images printed with digital printers and analog cylinders, in accordance with an embodiment.

An embodiment can be understood with reference to FIG. 2, a schematic diagram of the hybrid printing system for aligning images printed with digital printers and analog cylinders. As an example, the illustration shows that the printing system 200 is printing a substrate that is fabric 202. This particular printing table or bed 201 is approximately 30 feet long, which is considered to be a large printer. In this particular illustration, the fabric 202 is fed to the machine on one end. The fabric is mechanically placed onto a moving belt 204 that is sticky, so as to help keep the substrate 202 aligned as it passed through the printing system 200.

As the substrate 202 moves along the belt 204, it moves under printing bars 206. In this illustration there are shown eight bars or modules. It should be appreciated that the number of printing bars are by way of example only and are not meant to be limiting. For example, there could be six printing bars or 10 printing bars. As the substrate 202 moves under the printing bars 206, the printing bars 206 are injecting ink over the fabric 202. In this particular example, there are eight bars which are printing eight colors. In an embodiment, these bars are printing digitally, thus such bars 206 effect an inkjet printer, e.g. one color per bar.

Next, after going under the eight bars, the fabric reaches a cylinder 208. In an embodiment, the cylinder 208 is a rotary cylinder that is printing mechanically. It should be appreciated that the printing system 200 can be configured to have more than one cylinder (e.g. two) and that one cylinder 208 is meant to be illustrative. In an embodiment, the cylinder 208 has engraved on it a particular image. The ink is transferred from the cylinder to the fabric, thereupon imprinting the image that was engraved on the cylinder, e.g. via standard rotary screen printing techniques. For example, a mesh of cylindrical shape is used to transfer ink (or dye) onto a substrate, except in areas made impermeable to the ink by a blocking screen. The color is applied from inside while the rotary screen is revolving. A separate screen is required for each color of the design being printed. The screens rotate in contact with the substrate and the print paste is fed from inside the screens. The paste is forced from out of the inside of the screen by means of a metal squeegee blade or magnetic rod. The fabric is adhered to a continuous washable rubber belt, although in rotary screen printing the fabric and substrate run continually through the machine. The printed substrate is taken off the end of the machine and dried.

In an embodiment, when the cylinder is produced, the process also engraves the image onto the cylinder, for example, by technologies including but not limited to ultraviolet (UV) imprinting or laser technology. For the mechanical part, the cylinder has the image engraved once and does not change.

Thus, printing machine 200 is configured to print both digitally and mechanically or analog printing.

In an embodiment, the belt 204 runs fast at or around 90 meters per minute. The speed of the machine can be from potentially near zero, e.g. 1 meter/min, up to some hundreds of meters per minute.

In an embodiment, after the substrate or fabric passes under the cylinder, such substrate typically is passed on to further processing, such as but not limited to a dryer or other systems.

In an embodiment, printing system 200 includes a bridge 210. There is a carriage element 212 over the bridge 210 that moves a camera 213. In an embodiment, the camera 213 is positioned to look over or be focused over the substrate, the fabric 202, that is moving along the belt 204. The camera 213 is used in the process of checking the quality of the alignment between the digital and the analog printing processes or elements (206 and 208).

In an embodiment, the camera 213 is positioned relative to the edge of the substrate. The substrate can be wide or narrow. The camera 213 can be moved to the edge of the substrate. Thus, the carriage 212 is used to slide or move the camera into the desired position on the bridge 210.

Why Digital Plus Analog

In an embodiment, having digital printing capabilities as well as analog printing capabilities is desirable. It has been found that there can be some limitations with using digital printing without also using analog printing. For example, a digital printing configuration might not be able to print inks containing metals, such as for example, gold, silver, or copper. It has been found in the fashion industry that it is desirable to print T-shirts with some kind of metal ink printed thereupon. The ink with metals can be dangerous for printheads for digital printers. Such types of metal inks have been found to clog the printheads (e.g. 206). Thus, it is desirable to print the metal inks using an analog printing mechanism. With the innovative hybrid printer 200, an improved, more robust printing system, is provided.

Markers

In an embodiment, the digital designer causes a marker (e.g. 106) to be printed onto the substrate (e.g. fabric or 104).

Figure 3A:
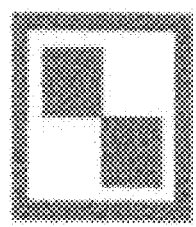
FIG. 3A is a schematic diagram of a digital printing pattern for a digital marker, in accordance with an embodiment.
Figure 3B:
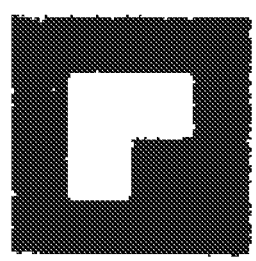
FIG. 3B is a schematic diagram of an analog printing pattern for an analog marker, in accordance with an embodiment.

Designs of markers include but are not limited to a round circle, a cross, and a circle with a cross. An example of a digital printing pattern for a digital marker is shown in FIG. 3A and an example of an analog printing pattern for an analog marker is shown in FIG. 3B. The substrate has been pre-printed with a marker for the analog aspect of the innovation and a different marker for the digital aspect of the innovation, e.g. as shown in 106 and FIGS. 3A and 3B, respectively.

The camera, facing down towards the substrate, captures the images of both markers and causes the distance between the two to be calculated or measured. Then, based on the distance, the innovation will make or provide a compensation. Specifically, the position of the movement of the substrate is measured through a digital measurement system, such as a rotary encoder or a linear encoder. The camera continuously captures digital images taken from the substrate. The image data are transferred to a processing device, e.g. a personal computer, an electronic board, etc. The processing device continuously searches for a specific pattern on the substrate, e.g. as shown in FIGS. 3A and 3B. There are two different shapes, one for digital and one for analog. When the image contains one specific shape, the processing device identifies the shape and calculate its position taken from the encoder of the substrate. Given that the two patterns must have a predefined distance (given by the designer and stored into the processing device), the processing device is able to calculate the real difference of position (or the error). When the error is greater than a predetermined acceptable value a compensation is made as explained in further detail below.

Examples of the compensation process include but are not limited to delay or anticipate the digital printing in order to have the two markers be at the right distance. Because the desired outcome is to produce a single design, alignment of the analog and digital printing processes is important. As an example, a designer may want gold ink to print inside a digitally printed flower. It would not be desirable to for the gold ink to print randomly.

Two Directions

In an embodiment, measurements are taken in two directions, e.g. x-y-direction, as depicted by the cross 106 as shown in FIG. 1. That is, one direction is in the direction of the substrate moving forward, for example, as depicted by the arrow 108 in FIG. 1. In an embodiment, such direction, the forward progression of the substrate, is considered the primary direction. However, in another embodiment, another direction to take into consideration is the direction perpendicular to the cross 108, or the y-direction, e.g. traversing the width of the substrate.

Thus, in an embodiment, one way of compensating for an unacceptable difference between the analog and the digital measurements is to delay or anticipate, e.g. increase, the movement of the substrate 104 in the direction of the arrow 108.

In an embodiment, the system is configured to compensate for the second direction, e.g. in the direction along the width of the substrate, by moving the digital printer electronically. For instance, the system can be configured to send the printing or image data in a new way or shifted. That is, the system can be configured to shift the image data upward or downward in the direction of the width of the substrate or perpendicular to the arrow 108, for example.

Thus, the system can be configured to adjust or compensate for the direction transversal to the forward motion of the substrate by doing so electronically, not mechanically.

In another embodiment, the mechanical part of the system, the rotary cylinder (e.g. 208) can also be adjusted, e.g. moved, to compensate for undesirable alignment. In an embodiment, the cylinder (e.g. 208) can be moved in the y-direction, or up and down along the axis that is transverse to the motion of the substrate (e.g. 202). In an embodiment, the system is configured with a motor that is attached to the cylinder in such a way as to be able to move the cylinder in the y-direction.

It has been found that it may be considered easier to move or adjust the digital printer, because it is the electronic data that is being adjusted, as opposed to moving a part, such as the rotary cylinder.

Thus, the innovation provides hybrid machine printing, both digitally and mechanically and alignment for such hybrid system.

Textile

Also, the innovation provides hybrid machine printing, both digitally and mechanically and alignment for such hybrid system printing textiles, fabrics.

It has been found that textiles are not an easy substrate to print. For instance, textiles include a mesh that a person can see if they look closely enough. There is a mesh because the wires or threads are crossed and this is difficult to capture with the camera. Also, it has been found that issues arise such as shrinking of the fabric. Also, as the image is printed onto the material, the surface absorbs a lot of the ink. The final dimension could be different from what the user or print operator would expect. For instance, if the machine is configured to print the value of one centimeter of diameter, it is possible to get some percentage less or more, depending on the fabric. Thus, the innovation employs or processes an image analysis algorithm that is suitable for capturing the dimensions of the mesh, such mesh as described above.

Camera—Frame Rate And Resolution

In an embodiment, the cameras (e.g. 102 or 213) have a frame rate and resolution sufficient to manage the speed of the machine, for instance to capture the markers (e.g. 106) of the substrate (e.g. 104 or 202) as they pass under the cameras along the belt (e.g. 110 or 204). Resolutions and frame rate can be variable according to the speed of the belt and size of the markers. Common values are 20 frames per second and resolution 1920×1080 pixels. An example speed of the machine, e.g. speed of substrate passing under the printheads and the cameras, is 90 meters per minute.

Computing Difference Between Markers

In an embodiment, the difference between the two markers is computed at every turn of the cylinder, at every image. It should be appreciated that with every turn of the cylinder there is one copy of the image being printed. One cylinder turn is one picture or image. A sensor mounted on the fixed part of the machine can detect every turn of the cylinder and cause the camera to capture a picture. In an embodiment, the cameras capture an image of the two markers, compute or cause to compute an error or distance between the two markers. The error measures are stored into the computer memory.

In an embodiment, digital printing server technology is employed and processed for causing the performance of digital printing operations (e.g. the operation of the printheads 206). Thus, such digital printing server technology can be adapted to compute the errors between the markers and store such errors. In another embodiment, one or more of the cameras is configured to capture each image of the markers, compute the difference between the markers, and store such difference (also referred to herein as "errors") in a local memory or cause to be stored in a remote memory.

An example of measurement is as follows:
Position of digital pattern: 13.023 microns
Position of analog pattern: 10.500 microns
Nominal distance of the two patterns: 3.000 microns
Measured distance=13.023−10.500=2.523 microns
Error=2.523−3.000=−477 microns Computing and Aligning the Size In an embodiment, a processor computes the difference between the size of the digital image and the image as produced by the analog cylinder. That is, the system makes another kind of compensation for error. The printer (e.g. 200 or 100) or the application running the printer, prints the mechanically printed image over the digitally printed image, or vice-versa depending on the desired configuration of the printer. However, it has been found that that the mechanical cylinder can give a slightly different size compared to the digital, or vice-versa. Typically, measurements of size differences are on the order of 1/10th of a millimeter to one meter of image. Typical errors of size are on the order of magnitude of 10 to 20% of the size. In a normal analogic printer the size is less than 1.500 mm and therefore the error is less than 300 mm. It is sufficient to have a camera that has a field of view of about 300 mm and resolution sufficient to manage the desired error.

For example, the system can detect a size difference between one meter of image in digital and one meter and 1/10th of millimeter in mechanical. In accordance with embodiments herein, the system is configured to stretch the mechanical image or enlarge the digital image to make the two images fit together as designed and intended. Put another way, the innovative system ensures that the digital size aligns over the mechanical size (or vice-versa).

How to Modify the Size

In accordance with embodiments herein, there are two ways to modify the size. The first is sending a message to the digital processor or server, the message including a request to stretch or enlarge the size of the image. For example, the image can be stretched in the horizontal direction (X axis), in the vertical direction (Y axis), or in both directions. Similarly, the request can be to shrink the size of the image. The response of the computer to stretch or shrink the digital image may be delayed for example for a few seconds. However, after the initial delay, the computer has adjusted the digital printing to produce the image in the newly desired size.

The second implementation for changing the size of the image is by changing the size of the mechanical image. More specifically, the system can change the speed of the cylinder to change the size of the mechanical image.

Number of Cameras

In an embodiment, two cameras are employed to measure the difference between the images printed on the left and right sides or top and bottom sides of the substrate. A camera can be positioned on the either side of the belt. It has been found that using one camera allows aligning the position of the images relative to one another as measured by the difference of the respective markers. However to also measure the alignment of the sizes of the images at least two cameras are employed. It should be appreciated that a plurality of cameras can be integrated into the system and method.

In one embodiment, to compensate width and Y offset errors there are two cameras, one on the right edge of the design and the other on the left edge of the design. The two cameras capture the markers for analog and digital both on left and right. The associated captured variables can be called as follows:

| | |
|---|---|
| YLA | Y LEFT ANALOG |
| YRA | Y RIGHT ANALOG |
| YLD | Y LEFT DIGITAL |
| YRD | Y RIGHT DIGITAL |

The error in offset of the digital image vs. the analog image is:

Offset error=YRA−YRD

While the error in width of the digital image vs. the analog image is:

Width of analog print is =YRA−YLA

Width of digital print is =YRD−YLD

Error of width between the two images is:

Width error=YRA−YLA−(YRD−YLD)

Other embodiments for determining the error are contemplated in which a subset of the parameters are used in calculating the error, in which more than two cameras are used to capture images of the substrate and additional variables are used in the calculation of the error, and in which other relationships between any of the aforementioned variables are used in calculating the error.

Compensation

In an embodiment, the computer calculates the difference or error but does not send the difference or error directly to the compensating processor. Sending the difference directly to the compensating processor may mislead the system, e.g. with a false positive due to one anomaly that can cause some kind of instability with the printing process. Thus, in accordance with an embodiment, the system produces a compensation-type calculation based on the average or other predetermined plan of the alignment. For example, the system can be configured to calculate an average of the difference from any of five to ten turns of the cylinder. As a more specific example, the difference of the images from five cylinder turns is computed and sent to a compensating algorithm, such as for example to a Proportional-Integral-Derivative (PID) control algorithm. Another example is that the captured YRA, YLA, YRD, YLD numbers are stored in an array of numbers. The array length can be made large at will. The Width and Offset errors can be calculated using the average error, excluding outsider numbers.

Non-Hybrid Embodiments

It should be appreciated that the machine (e.g. 200 or 100) can be configured to make adjustments when operating only the digital printer aspect, for instance the printheads, or operating only the cylinder aspect of the printer. For example, in a single-pass situation where a second set of printheads are ejecting ink onto an image just printed by a first set of printheads, the innovative process can be implemented. As an example the first digital color can be used as a reference and the other digital colors are subject to be moved by this system. Every color can print a different pattern and the camera can delay or anticipate the printing in order to print such patterns in the correct position.

An Exemplary Process

Figure 4:
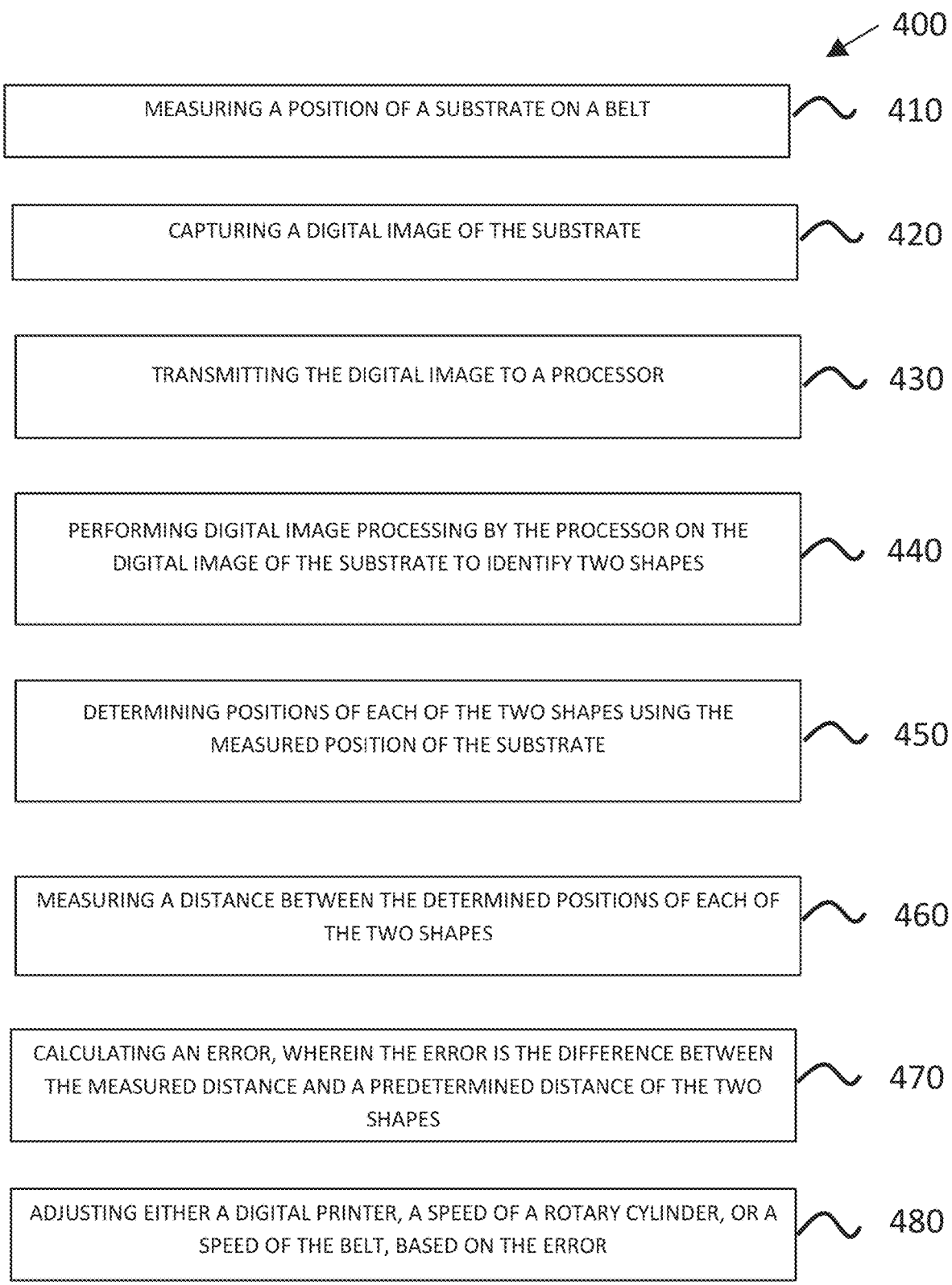
FIG. 4 is a flow diagram for aligning images printed with a digital printer and analog cylinders, in accordance with an embodiment.

An exemplary process for aligning images printed with a digital printer and analog cylinders can be understood with reference to FIG. 4. The method 400 includes at step 410 measuring, by an encoder, a position of a substrate (e.g. 104 in FIGS. 1 and 202 in FIG. 2) on a belt (e.g. 110 in FIGS. 1 and 204 in FIG. 2).

The method 400 includes at step 420 capturing, by a first camera (e.g. 102 in FIGS. 1 and 213 in FIG. 2), at least one digital image of the substrate.

Figure 5:
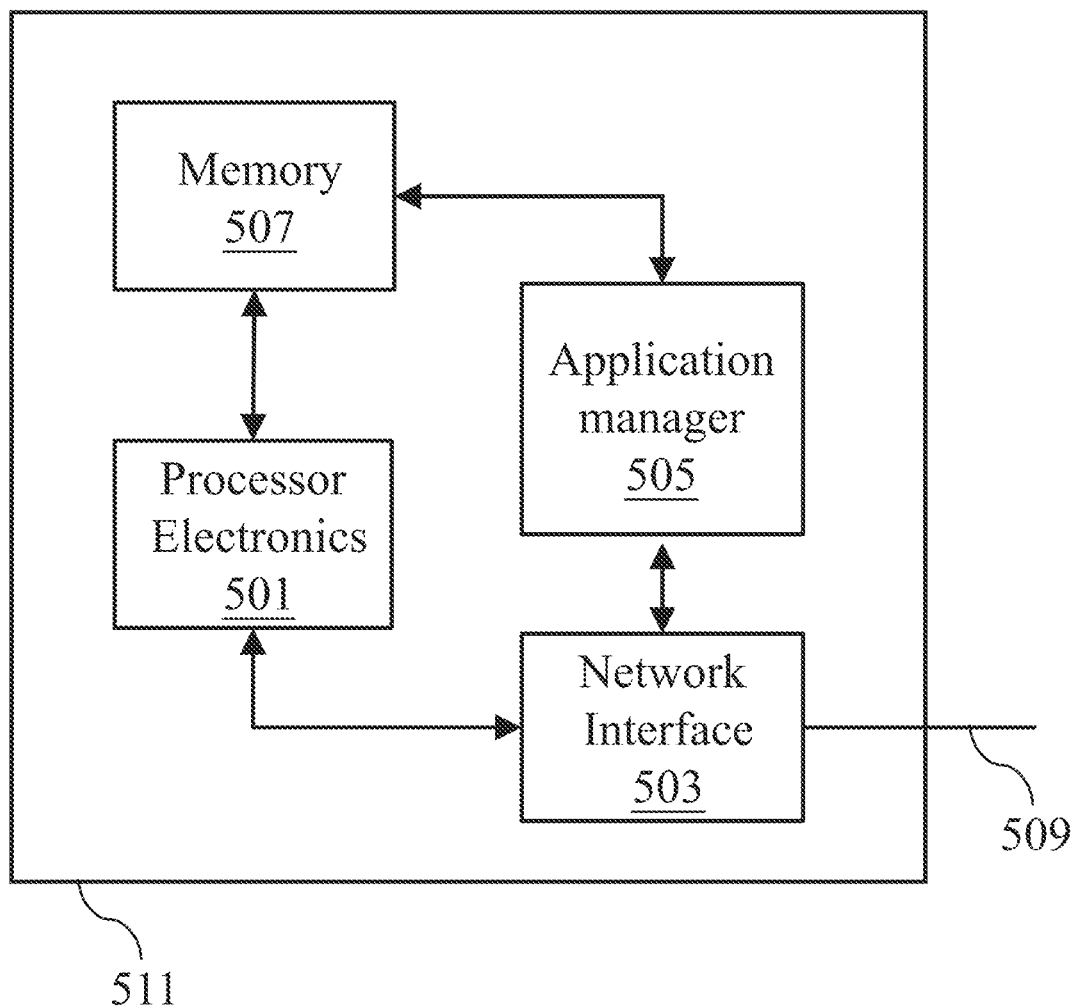
FIG. 5 is a block schematic diagram of a system in the exemplary form of a computer system according to an embodiment.

The method 400 includes at step 430 transmitting, by a processor (e.g. 501 in FIG. 5) on the first camera, the at least one digital image to a processing device (e.g. 511 in FIG. 5).

The method 400 includes at step 440 performing digital image processing by the processing device on the at least one digital image to identify two shapes (e.g. FIG. 3A and FIG. 3B).

The method 400 includes at step 450 responsive to identifying the two shapes, determining, by the processing device, positions of each of the two shapes (e.g. 106 in FIG. 1) using the measured position of the substrate.

The method 400 includes at step 460 measuring, by the processing device, a distance between the determined positions of each of the two shapes.

The method 400 includes at step 470 calculating, by the processing device, an error, wherein the error is the difference between the measured distance and a predetermined distance of the two shapes.

The method 400 includes at step 480 adjusting either a digital printer (e.g. 206 in FIG. 2), a speed of a rotary cylinder (e.g. 208 in FIG. 2), or a speed of the belt, based on the error.

An Example Machine Overview

FIG. 5 is a block schematic diagram representation of a portion of a device, in accordance with some embodiments of the presently disclosed technology. A device 511 can include processor electronics 501 such as a microprocessor that implements one or more of the techniques presented in this document. The device 511 can include a network interface 503 to send and/or receive data over one or more communication interfaces 509, e.g. Ethernet. Device 511 can include one or more memories 507 configured to store information such as data and/or instructions. Device 511 can further include application manager 505. In some implementations, the processor electronics 501 can include at least a portion of the network interface 503 and/or the application manager 505. In some embodiments, at least some of the disclosed techniques, modules or functions are implemented using the device 511. For example, the device 511 may be used to implement the processor that performs the method 500. In such embodiments, the device 511 may store portions of media files, encryption keys and certificates in the one or more memories 507.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that are known in the art, including, but not limited to, communications over the Internet, wired, or wireless networks using the appropriate protocols.

Although the invention is described herein in terms of several embodiments, one skilled in the art will readily appreciate that other applications may be substituted for those set forth herein without departing from the spirit and scope of the present invention. Accordingly, the invention should only be limited by the Claims included below.

The invention claimed is:

1. A method for aligning images printed with digital printer and rotary cylinders, the method comprising:
   measuring, by an encoder, a position of a substrate on a belt;
   capturing, by a first camera, at least one digital image of the substrate;
   transmitting, by a processor on the first camera, the at least one digital image to a processing device;
   performing digital image processing by the processing device on the at least one digital image to identify two shapes;
   responsive to identifying the two shapes, determining, by the processing device, positions of each of the two shapes using the measured position of the substrate;
   measuring, by the processing device, a distance between the determined positions of each of the two shapes;
   calculating, by the processing device, an error, wherein the error is the difference between the measured distance and a predetermined distance of the two shapes; and
   adjusting either a digital printer, a speed of a rotary cylinder, or a speed of the belt, based on the error.

2. The method of claim 1, wherein one shape of the two shapes is a digital printing pattern and the other shape is an analog printing pattern.

3. The method of claim 2, further comprising:
   providing a second camera, wherein the first camera is located at a right edge of a design on the substrate and the second camera is located at a left edge of the design;
   each camera capturing the digital printing pattern and the analog pattern located on the right edge and the left edge of the design;
   populating four parameters based on the patterns captured by the cameras, the four parameters including a left analog value (YLA), a right analog value (YRA), a left digital value (YLD), and a right digital value (YRD);

wherein calculating the error further comprises:

calculating an error in offset of the digital printing pattern versus the analog printing pattern as:

offset error=YRA−YRD;

calculating an error in width of the digital printing pattern versus the analog printing pattern as:

width of analog printing pattern is =YRA−YLA;

width of digital printing pattern is =YRD−YLD; and calculating a total error of width between the digital printing pattern and the analog printing pattern as:

width error=YRA−YLA−(YRD−YLD).

4. The method of claim 3, further comprising:
storing a plurality of YRA, YLA, YRD, YLD values in an array;
calculating an average value for each of YRA, YLA, YRD, YLD using the stored values; and
wherein calculating the error further comprises using the average values for each of YRA, YLA, YRD, YLD.

5. The method of claim 1, wherein adjusting the digital printer comprises shifting the image data to be digitally printed upward or downward in the direction of movement of belt or perpendicular to the belt.

6. The method of claim 1, wherein adjusting the rotary cylinder comprises moving the cylinder along an axis that is perpendicular to the belt or up or down an axis that is in the direction of movement of the belt.

7. The method of claim 1, wherein adjusting the digital printer comprises stretching or shrinking the size of the image to be digitally printed.

8. The method of claim 1, wherein adjusting the rotary cylinder comprises changing the speed of the rotary cylinder to cause the size of the mechanical image to change.

9. The method of claim 1, wherein the predetermined distance of the two shapes is provided by a designer or manufacturer.

10. The method of claim 1, wherein the camera is attached to movable carriage that is integrated into a bridge that spans over the belt along an axis that is transverse to the movement of the belt.

11. A system for aligning images printed with digital printer and rotary cylinders, the method comprising:
an encoder configured to measure a position of a substrate on a belt;
a first camera configured to capture at least one digital image of the substrate;
a processor on the first camera configured to transmit the at least one digital image to a processing device;
wherein the processing device is configured to perform digital image processing on the at least one digital image to identify two shapes;
wherein the processing device is further configured determine positions of each of the two shapes using the measured position of the substrate, responsive to identifying the two shapes;
wherein the processing device is further configured to measure a distance between the determined positions of each of the two shapes;
wherein the processing device is further configured to calculate an error, wherein the error is the difference between the measured distance and a predetermined distance of the two shapes; and
an adjusting processor configured to adjust either a digital printer or a speed of a rotary cylinder based on the error.

12. The system of claim 11, wherein one shape of the two shapes is a digital printing pattern and the other shape is an analog printing pattern.

13. The system of claim 12, further comprising:
a second camera, wherein the first camera is located at a right edge of a design on the substrate and the second camera is located at a left edge of the design;
wherein each camera is configured to capture the digital printing pattern and the analog pattern located on the right edge and the left edge of the design;
a populating processor configured to populate four parameters based on the patterns captured by the cameras, the four parameters including a left analog value (YLA), a right analog value (YRA), a left digital value (YLD), and a right digital value (YRD); and
wherein the processing device is further configured to calculate the error by:
calculating an error in offset of the digital printing pattern versus the analog printing pattern as:

offset error=YRA−YRD;

calculating an error in width of the digital printing pattern versus the analog printing pattern as:

width of analog printing pattern is =YRA−YLA;

width of digital printing pattern is =YRD−YLD; and calculating a total error of width between the digital printing pattern and the analog printing pattern as:

width error=YRA−YLA−(YRD−YLD).

14. The system of claim 13, further comprising:
a storage configured to store a plurality of YRA, YLA, YRD, YLD values in an array;
a calculating processor configured to calculate an average value for each of YRA, YLA, YRD, YLD using the stored values; and
wherein the processing device is further configured to calculate the error by using the average values for each of YRA, YLA, YRD, YLD.

15. The system of claim 11, wherein the adjusting processor is further configured to adjust the digital printer by shifting the image data to be digitally printed upward or downward in the direction of movement of belt or perpendicular to the belt.

16. The system of claim 11, wherein the adjusting processor is further configured to adjust the rotary cylinder by moving the rotary cylinder along an axis that is perpendicular to the belt or up or down an axis that is in the direction of movement of the belt.

17. The system of claim 11, wherein the adjusting processor is further configured to adjust the digital printer by stretching or shrinking the size of the image to be digitally printed.

18. The system of claim 11, wherein the adjusting processor is further configured to adjust the rotary cylinder by changing the speed of the rotary cylinder to cause the size of the mechanical image to change.

19. The system of claim 11, wherein the predetermined distance of the two shapes is provided by a designer or manufacturer.

20. The system of claim 11, wherein the camera is attached to movable carriage that is integrated into a bridge that spans over the belt along an axis that is transverse to the movement of the belt.

* * * * *